United States Patent
Yang et al.

(10) Patent No.: US 9,558,764 B2
(45) Date of Patent: *Jan. 31, 2017

(54) WAVEGUIDE OF A WRITE HEAD WITH REDUCED CROSS SECTIONAL AREA PROXIMATE A NEAR-FIELD TRANSDUCER

(71) Applicant: Seagate Technology LLC, Cupertino, CA (US)

(72) Inventors: Ruoxi Yang, St. Louis Park, MN (US); Pierre Asselin, Richfield, MN (US); Yongjun Zhao, Eden Prairie, MN (US); James Gary Wessel, Savage, MN (US); Tae-Woo Lee, Eden Prairie, MN (US); Werner Scholz, Camberwell (AU); Frank Edgar Stageberg, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,240

(22) Filed: Oct. 19, 2015

(65) Prior Publication Data

US 2016/0118069 A1   Apr. 28, 2016

Related U.S. Application Data

(60) Provisional application No. 62/067,749, filed on Oct. 23, 2014.

(51) Int. Cl.
| | | |
|---|---|---|
| G11B 11/00 | (2006.01) | |
| G11B 5/187 | (2006.01) | |
| G11B 5/60 | (2006.01) | |
| G02B 6/122 | (2006.01) | |
| G11B 5/31 | (2006.01) | |
| G11B 5/00 | (2006.01) | |
| G11B 11/105 | (2006.01) | |

(52) U.S. Cl.
CPC ............ *G11B 5/1871* (2013.01); *G02B 6/122* (2013.01); *G11B 5/314* (2013.01); *G11B 5/6088* (2013.01); *G11B 11/10532* (2013.01); *G11B 11/10543* (2013.01); *G11B 11/10554* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,270,791 B2 * | 9/2012 | Komura | B82Y 20/00 |
| | | | 369/44.12 |
| 8,509,037 B1 | 8/2013 | Huang et al. | |
| 8,619,514 B1 | 12/2013 | Matsumoto | |

(Continued)

*Primary Examiner* — Tan X Dinh
(74) *Attorney, Agent, or Firm* — Hollingsworth Davis, LLC (57) ABSTRACT

A write head includes a near-field transducer near a media-facing surface of the write head. The write head includes a waveguide having a core with a first side disposed proximate to the near-field transducer. The core overlaps the near-field transducer at a substrate-parallel plane. The core includes one of a step or a taper on a second side facing away from the first side. The step or the taper causes a reduced thickness of the core normal to the substrate-parallel plane. The write head includes a cladding layer that encompasses the second side of the core and that fills in the step or the taper.

20 Claims, 8 Drawing Sheets

(56) References Cited

U.S. PATENT DOCUMENTS

| | | |
|---|---|---|
| 9,147,415 B2 | 9/2015 | Clinton et al. |
| 2007/0110379 A1 | 5/2007 | West et al. |
| 2007/0230288 A1* | 10/2007 | Nishida ................. B82Y 10/00 369/13.13 |
| 2007/0242921 A1* | 10/2007 | Matsumoto ............ B82Y 20/00 385/33 |
| 2011/0019510 A1* | 1/2011 | Nishida ................. B82Y 10/00 369/13.12 |
| 2011/0216635 A1* | 9/2011 | Matsumoto ............ G11B 5/105 369/13.33 |
| 2012/0039155 A1 | 2/2012 | Peng et al. |
| 2012/0182842 A1* | 7/2012 | Iwanabe ................ G11B 5/314 369/13.33 |
| 2012/0327751 A1* | 12/2012 | Iwanabe ................ G11B 5/314 369/13.02 |
| 2013/0142020 A1* | 6/2013 | Rawat .................... G11B 5/314 369/13.33 |
| 2013/0223806 A1 | 8/2013 | Itagi |
| 2015/0302874 A1* | 10/2015 | Asselin ................ G11B 5/6088 369/13.33 |
| 2016/0118070 A1* | 4/2016 | Yang ............. G11B 2005/0021 369/13.33 |
| 2016/0163341 A1* | 6/2016 | Cao ................ G11B 2005/0021 369/13.33 |
| 2016/0247525 A1* | 8/2016 | Lee ................ G11B 2005/0021 369/13.33 |

\* cited by examiner

WAVEGUIDE OF A WRITE HEAD WITH REDUCED CROSS SECTIONAL AREA PROXIMATE A NEAR-FIELD TRANSDUCER

RELATED PATENT DOCUMENTS

This application claims the benefit of Provisional Patent Application Ser. No. 62/067,749 filed on Oct. 23, 2014, to which priority is claimed pursuant to 35 U.S.C. §119(e), and which is incorporated herein by reference in its entirety.

SUMMARY

The present disclosure is related to a waveguide of a write head with a reduced cross-sectional area proximate to a near-field transducer. In one embodiment, a write head includes a near-field transducer near a media-facing surface of the write head. The write head includes a waveguide having a core with a first side disposed proximate to the near-field transducer. The core overlaps the near-field transducer at a substrate-parallel plane. The core includes one of a step or a taper on a second side facing away from the first side. The step or the taper causes a reduced thickness of the core normal to the substrate-parallel plane. The write head includes a cladding layer that encompassing the second side of the core and that fills in the step or the taper.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to an apparatus (e.g., a HAMR write head) having a waveguide that delivers light from an energy source (e.g., laser diode) to a near-field transducer (NFT). The NFT may also be referred to as a plasmonic transducer, plasmonic antenna, near-field antenna, nano-disk, nano-patch, nano-rod, etc. The light generates a surface plasmon field on the NFT, and the surface plasmons are directed out of a surface of the write head onto a magnetic recording medium. This creates a hotspot on the recording medium, lowering its magnetic coercivity and enabling a local magnetic field generated by a write pole to write data to the hotspot.

While the waveguide is designed to couple light from the energy source to the NFT as efficiently as possible, there will be some losses. One source of loss is stray light that propagates through the body of the write head. The stray light may sometimes reflect back to the energy source, other times reflect out of the media-facing surface of the write head. The former situation may lead to unwanted modulation of the energy source, and the latter may lead to unwanted erasure of the recording medium. Other effects that may be caused by stray light include unwanted heating of regions of the write head.

In embodiments described below, a write head includes waveguide features that are designed to reduce stray light near a coupling region of the waveguide and NFT. This involves, among other things, tailoring a shape of the waveguide core near the NFT to have regions of reduced cross-section. This may also involve using dielectric materials for the core and/or cladding that have lower refractive indices on the optical path near the media-facing surface. This can help redistribute the energy and enhance NFT efficiency.

Figure 1:
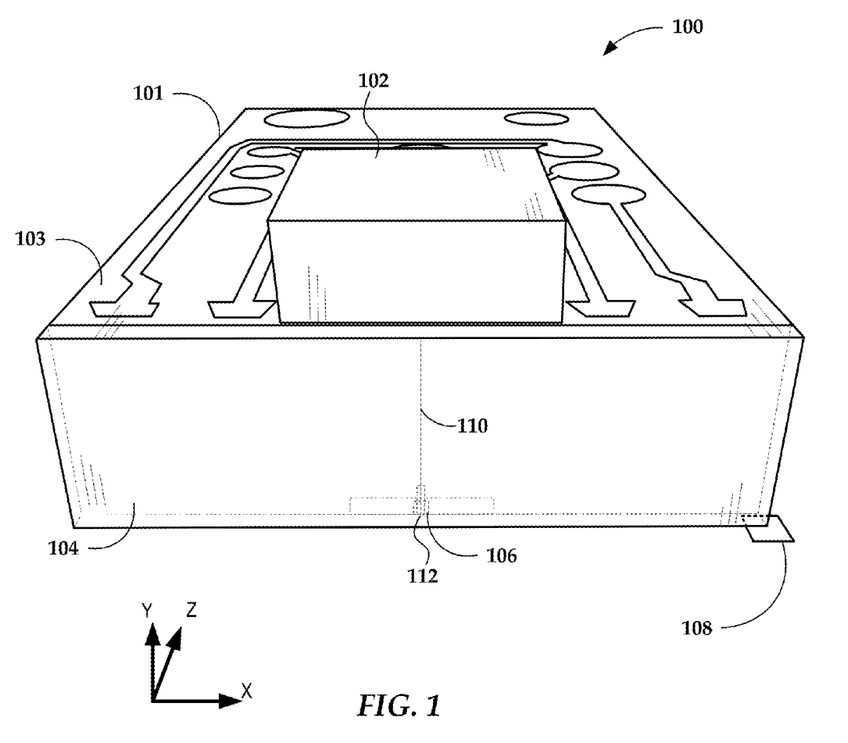
FIG. 1 is a perspective view of a slider assembly according to an example embodiment.

In reference to FIG. 1, a perspective view shows a HAMR write head 100 according to an example embodiment. The write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, etc.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface.

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the write head 100, and coupled to the slider by way of optic fiber and/or waveguide. An input surface of the slider body 101 may include a grating or other coupling feature to receive light from the laser via the optic fiber and/or waveguide.

Figure 2:
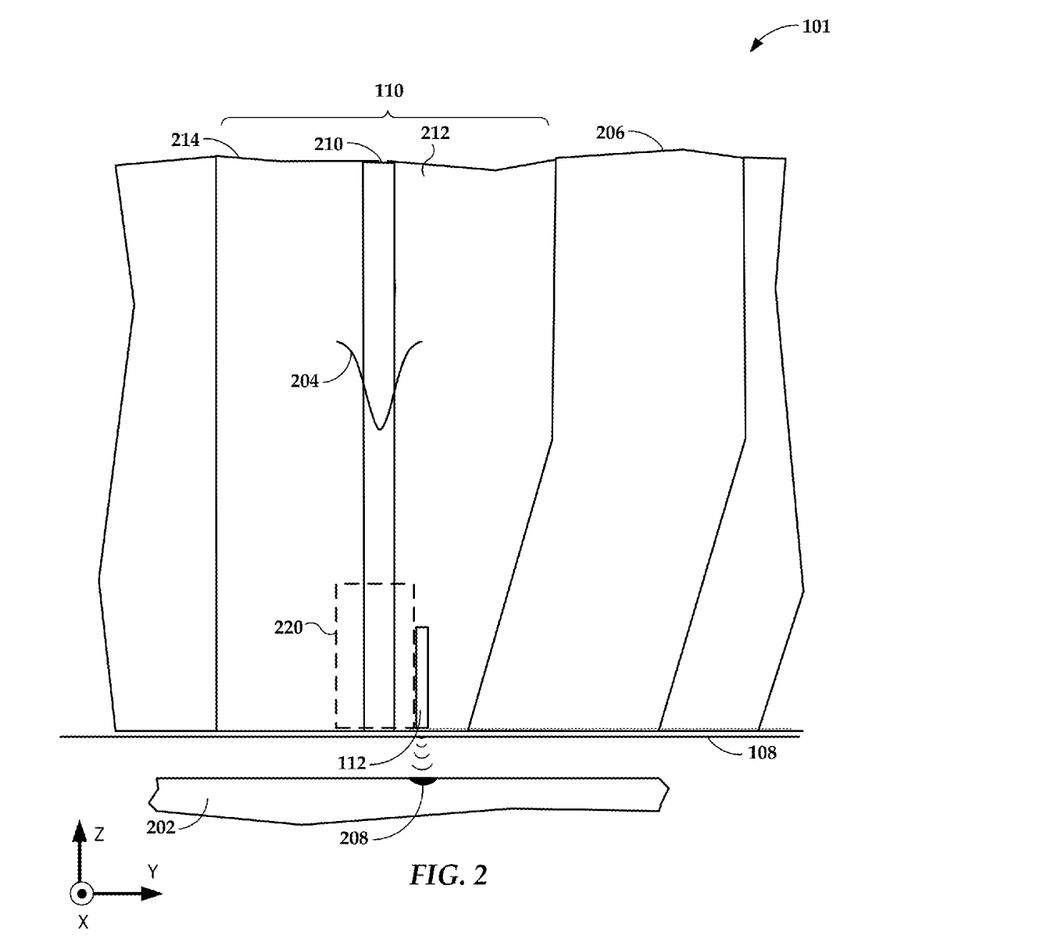
FIG. 2 is a cross-sectional view illustrating details of a light path according to an example embodiment.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hotspot 208 on the recording medium 202. A magnetic write pole 206 causes changes in magnetic flux near the media-facing surface 108 in response to an applied current. Flux from the write pole 206 changes a magnetic orientation of the hotspot 208 as it moves past the write pole 206 in the downtrack direction (z-direction).

The waveguide system 110 includes a core layer 210 surrounded by cladding layers 212, 214. The core layer 210 and cladding layers 212, 214 may be made from dielectric materials such as $Al_2O_3$, SiOxNy, $SiO_2$, $Ta_2O_5$, $TiO_2$, ZnS, SiNx, $Nb_2O_5$, AlN, $Hf_2O_3$, $Y_2O_3$, etc. Generally, the dielectric materials are selected so that the refractive index of the core layer 210 is higher than refractive indices of the cladding layers 212, 214. This arrangement of materials facilitates efficient propagation of light through the waveguide system 110.

As indicated by region 220, the core layer 210 includes a change in shape near the near-field transducer 112. This change in shape can raise and condense optical power to the near-field transducer 112 and thereby boost coupling efficiency and thermal gradient. In some embodiments this results in lowered media-to-head (MH) temperature ratio because of reduced background heating (resulting in lower media temperature) and/or increased light utilization by the near-field transducer 112 (resulting higher write head temperature)

Figure 3:
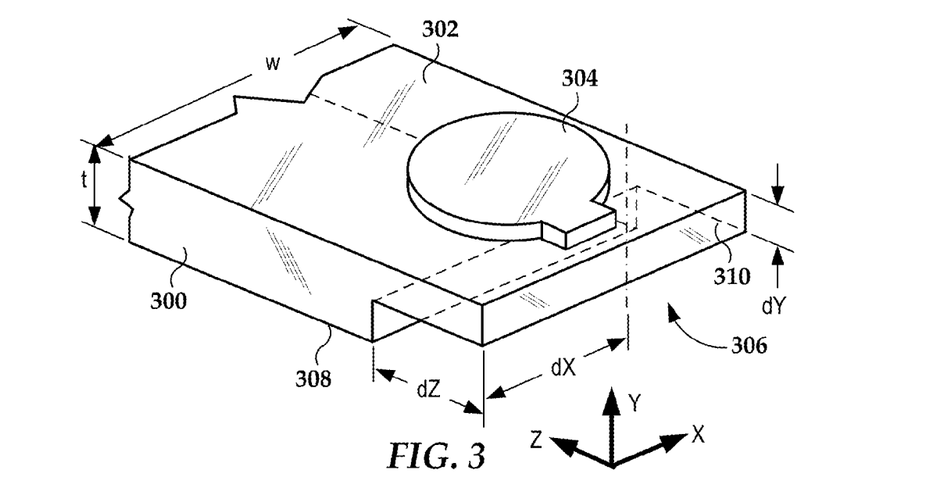
FIGS. 3 and 4 are perspective views of a waveguide core according to example embodiments.

In FIG. 3, a perspective view shows an example of an end of a waveguide core 300 according to an example embodiment. The core 300 has a first side 302 disposed proximate to a near-field transducer 304. The core 300 overlaps the near-field transducer 304 at a substrate-parallel plane (xz-plane). The core includes a rectangular step 306 on a second side 308 that facing away from the first side 302. The rectangular step 306 causes a reduced thickness (dY) of the core 300 normal to the substrate-parallel plane, e.g., compared to thickness t away from the near-field transducer 304.

While not shown, a cladding layer encompasses the second side 308 of the core 300 and fills in the step 306. A second cladding layer may be overlaid on the first side 302 and the near-field transducer 304. One or both of these cladding layers may also cover edges of the core 300. Surface 310 of the core 300 is at or near a media-facing surface (e.g., air bearing surface) of a write head.

Figure 4:
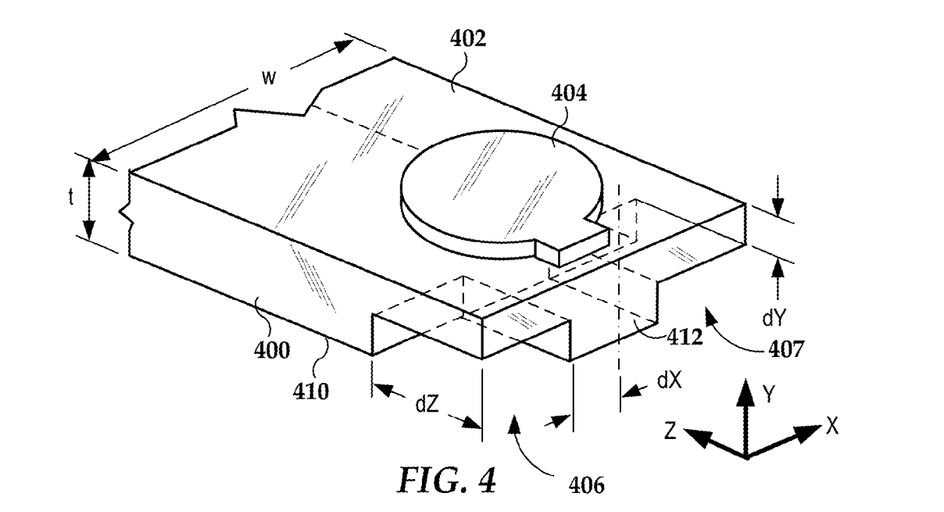

In FIG. 4, a perspective view shows an example of an end of a waveguide core 400 according to another example embodiment. The core 400 has a first side 402 disposed proximate to a near-field transducer 404. The core 400 overlaps the near-field transducer 404 at a substrate-parallel plane (xz-plane). A second side 410 of the core 400 includes two rectangular steps 406, 407 that cause a reduced thickness (dY) at an end of the core 400. A center region 408 is between the two rectangular steps 406, 407 and has an unreduced thickness (e.g., same thickness t as the rest of the core 400).

A cladding layer (not shown) encompasses the second side 410 of the core 400 and that fills in the steps 406, 407. A second cladding layer may be overlaid on the first side 402 and the near-field transducer 404. One or both of these cladding layers may also cover edges of the core 400. Surface 412 of the core 400 is at or near a media-facing surface (e.g., air bearing surface) of a write head.

In the above examples, the near-field transducer 304, 404 is shown as a circular disk with a peg extending towards the media-facing surface. Other near-field transducers shapes may be used with the illustrated waveguide cores 300, 400 (as well as other embodiments shown below), including one or more rectangular plates with or without a peg, a capsule shaped disk with a peg, and elongated peg without any plates, etc. Similarly, the relative sizes of core features, such as steps 306, 406, 407, height and width of the core 300, 400, etc., may vary from what is shown.

Figure 5:
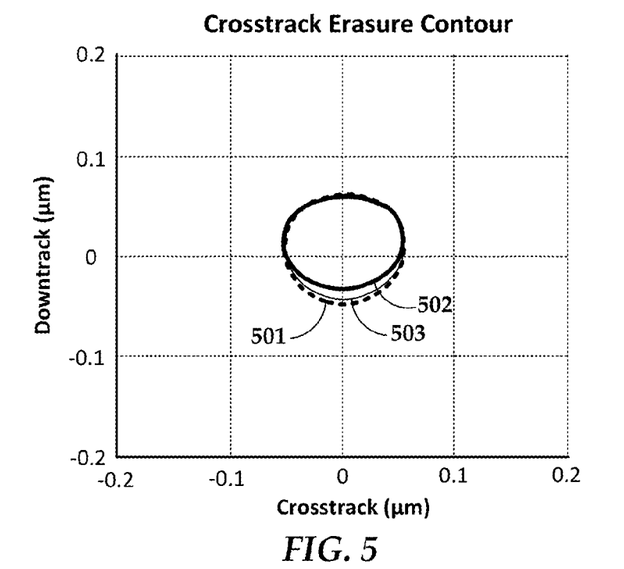
FIGS. 5-7 are graphs illustrating erasure performance of waveguide cores according to example embodiments.
Figure 6:
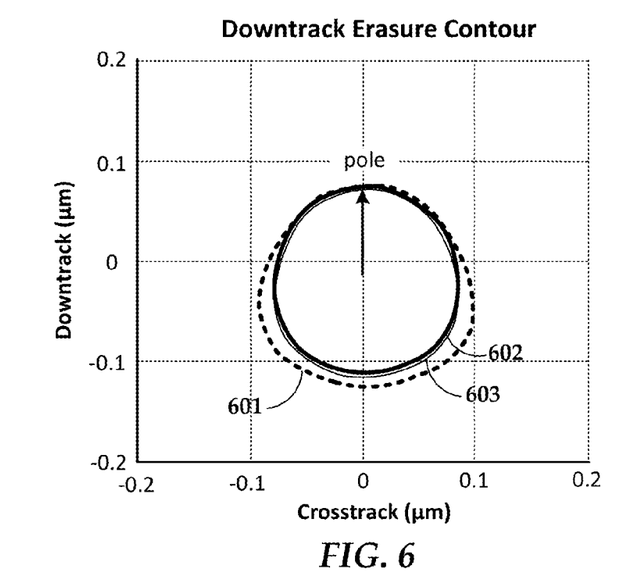
Figure 7:
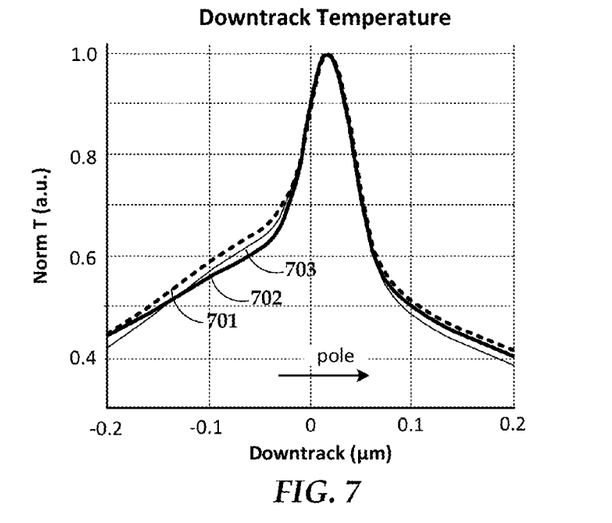

In FIGS. 5-7, graphs illustrate simulation results for two configurations as shown in FIGS. 3 and 4. In the graphs, the dashed curves 501, 601, 701, represent a baseline configuration, which includes a multimode waveguide with geometry similar to waveguide cores 300, 400, except without a step near the near-field transducer. Curves 502, 602, 702 represent a single-step configuration as in FIG. 3, with dZ=150 nm and dY=100 nm. Curves 503, 603, 703 with the represent a dual-step configuration as in FIG. 4, with dZ=150 nm, dX=100 nm, and dY=50 nm. For all configurations, the core thickness t is about 125 nm and core width w is about 800 nm.

As seen in FIGS. 5 and 6, the single-step configuration, corresponding to curves 502 and 602 exhibits a smaller erasure contour than baseline. The dual-step configuration, corresponding to curves 503 and 603, is also improved over baseline, although less so than the other configuration in the results shown in FIG. 5. As seen in FIG. 7, both stepped configurations provide a steeper thermal gradient than the baseline. Table 1 below summarizes simulation results of these configurations.

TABLE 1

|  | Baseline | Single step (FIG. 3) | Dual step (FIG. 4) |
| --- | --- | --- | --- |
| Downtrack erasure | 39.1 | 36.4 | 34.2 |
| Crosstrack erasure | 107.5 | 104.9 | 104.0 |
| Thermal gradient (sTG) | 5.38 | 5.60 | 5.73 |
| Scaled media-to-head temp. ratio (sMH) | 5.79 | 4.77 | 4.95 |
| Media Temp. (MT) | 77.7 | 77.8 | 79.3 |

Figure 8:
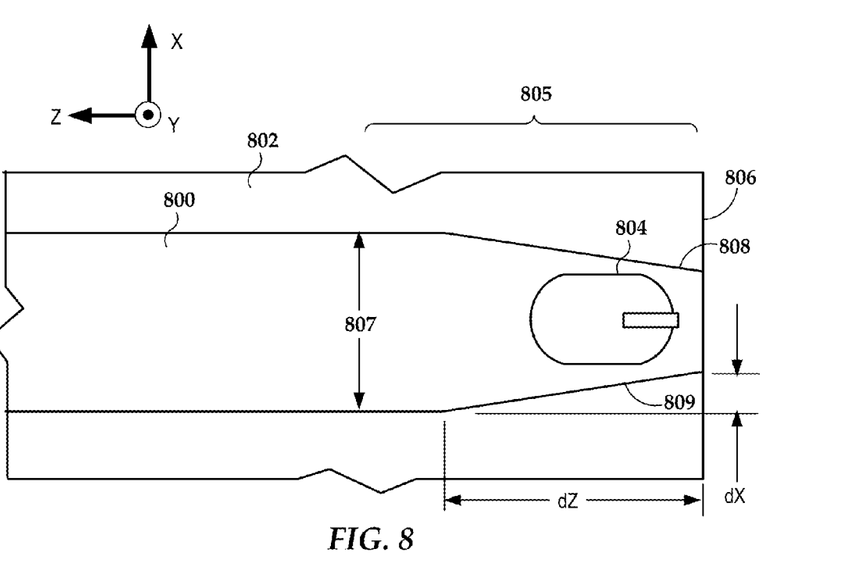
FIG. 8 is a plan view of a waveguide according to another example embodiment.

In FIG. 8, a plan view illustrates a waveguide end shape according to another example embodiment. A waveguide core 800 is shown on a substrate-parallel plane (xz-plane), overlaid on a bottom cladding layer 802. A near-field transducer 804 is overlaid on an end portion 805 the waveguide core 800 near a media-facing surface 806. In this example, the near-field transducer 804 is a capsule-shaped plate with a peg extending towards the media-facing surface 806, and is overlapped by the end portion 805 of the core 800.

The core 800 has two tapered edges 808, 809 near the media-facing surface 806 such that the end portion 805 has a decreasing cross-sectional area as it approaches the media-facing surface 806. The cross sections with decreasing area are taken on planes parallel to the media-facing surface 806 (xy-planes). The tapered edges 808, 809 each reduce a crosstrack width 807 of core 800 as it approaches the media-facing surface 806 by a value of dX. The tapered edges 808, 809 begin at a distance dZ from the media-facing surface 806.

Figure 9:
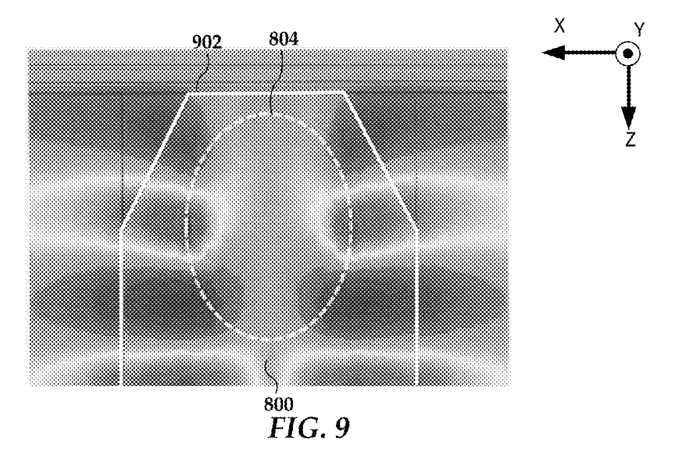
FIG. 9 is an electromagnetic field amplitude plot showing curved fields provided via a waveguide according to an example embodiment.
Figure 10:
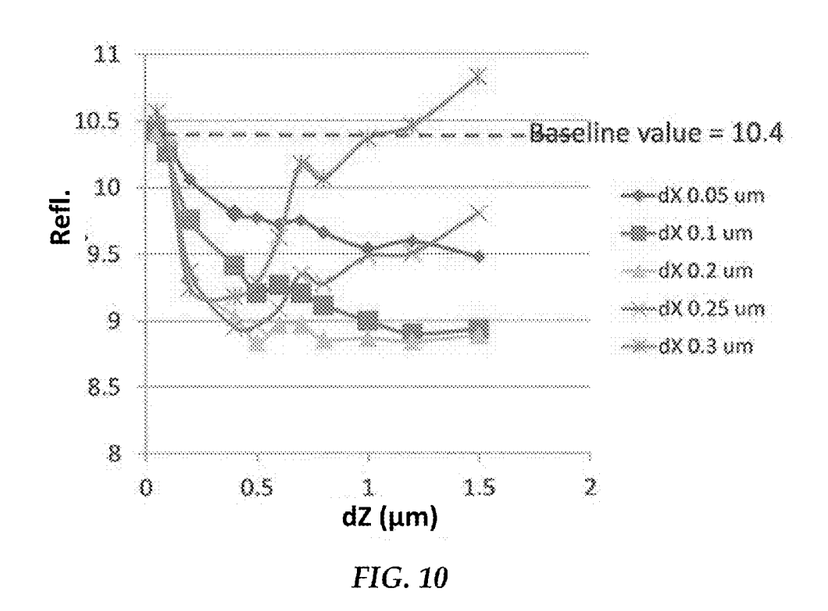
FIG. 10 is a graph illustrating effect of taper angles on reflection for waveguides according to example embodiments.

A simulation of the tapered configuration shown in FIG. 8 was performed, and some results are shown in FIGS. 9 and 10. In FIG. 9, a field intensity plot shows how a tapered waveguide core 900 matches the curvature of a circular or ovular near-field transducer 904. The field is bent near the media-facing surface 902, providing additional excitation efficiency.

In FIG. 10, a graph illustrates how different values of dX and dZ (as shown in FIG. 8) affect reflections for a core 800 with 0.8 µm crosstrack-width 807. As shown in the graph of FIG. 10, the highest reduction in reflections can be achieved by choosing 0.5 µm<dZ<1.0 µm (which is between ⅝ and 10/8 of the crosstrack width 807, nominally about 94% of the crosstrack width 807) and 0.1 µm<dX<0.25 µm (which is between ⅛ and 5/16 of the crosstrack width 807, nominally about 22% the crosstrack width 807). If a smaller range of dX can be maintained, e.g., 0.1 µm<dX<0.2 µm (which is between ⅛ and ¼ of the crosstrack width 807, nominally about 19% the crosstrack width 807), then the range of dZ can be loosened to 0.2 µm<dZ<1.5 µm (which is between ¼ and 15/8 times the crosstrack width, nominally about 106% of the crosstrack width 807).

Tapered edges 808, 809 that result in significant reduction of the cross track width (in other words, having high values of dX) may induce excessive leakage/mismatch and offset the benefits of enhanced MT and reduced reflection. Small values of dX and dZ do not significantly affect back reflections. Setting dX to about 0.2 µm for this example provides minimal back reflection and good fabrication tolerance. Table 2 below summarizes additional results of simulations of the tapered waveguide core, with the first row indicating a baseline configuration (no taper).

TABLE 2

| (dX µm, dZ µm) | Reflection | sTG | Media T | MH |
|---|---|---|---|---|
| (0.0, 0.0) | 10.4% | 1 | 1 | 1 |
| (0.2, 0.4) | 9.0% | +4.5% | +6.1% | +1.5% |
| (0.2, 0.5) | 8.8% | +5.5% | +6.9% | +1.3% |
| (0.3, 0.5) | 9.3% | +7.4% | +6.2% | +0.5% |
| (0.2, 0.6) | 9.0% | +5.0% | +6.3% | +1.7% |

Figure 11:
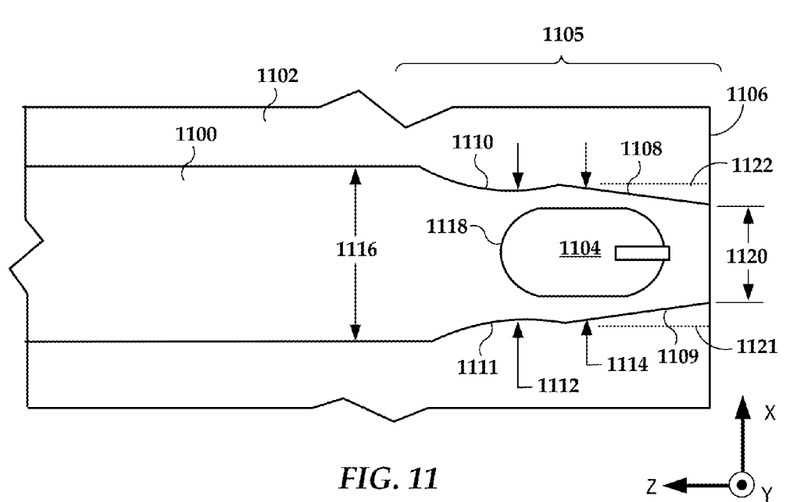
FIGS. 11 and 12 are plan views of waveguides according to example embodiments.

In FIG. 11, a plan view illustrates a waveguide end shape according to another example embodiment. A waveguide core 1100 is shown on a substrate-parallel plane (xz-plane), overlaid on a bottom cladding layer 1102. An end portion 1105 of the core 1100 overlaps a near-field transducer 1104 near a media-facing surface 1106. The end portion 1105 has curved, concave, depressions 1110, 1111 that pinch a cross-track dimension of the core 1100. The depressions 1110, 1111 result in a first crosstrack width 1112 over the near-field transducer 1104 that is less than a second crosstrack width 1114 near the media-facing surface 1106. The first crosstrack width 1112 is also less than a third crosstrack width 1116 at an end 1118 of the near-field transducer 1104 that faces away from the media-facing surface 1106, e.g., towards the light source. The difference between the first crosstrack width 1112 and the second and third crosstrack widths 1114, 1116 reduces reflections back to a light source optically coupled to the waveguide core 1100.

The illustrated end portion 1105 may also have tapered edges 1108, 1109 between the near-field transducer 1104 and the media-facing surface 1106. The tapered edges 1108, 1109 reduce a cross sectional area of the core 1100 as it approaches the media-facing surface 1106. A final crosstrack width 1120 of the end portion at the media-facing surface 1106 may be narrower than the first crosstrack width 1112. In other configurations, there may be no taper, as indicated by dashed lines 1121, 1122. In such a case, the final cross track width may be less than or equal to the third crosstrack width 1116 of the core 1100 away from the end portion 1105. In yet other configurations, the depressions 1110, 1111 may be differently shaped, e.g., formed from multiple line segments, circular, parabolic, etc.

Figure 12:
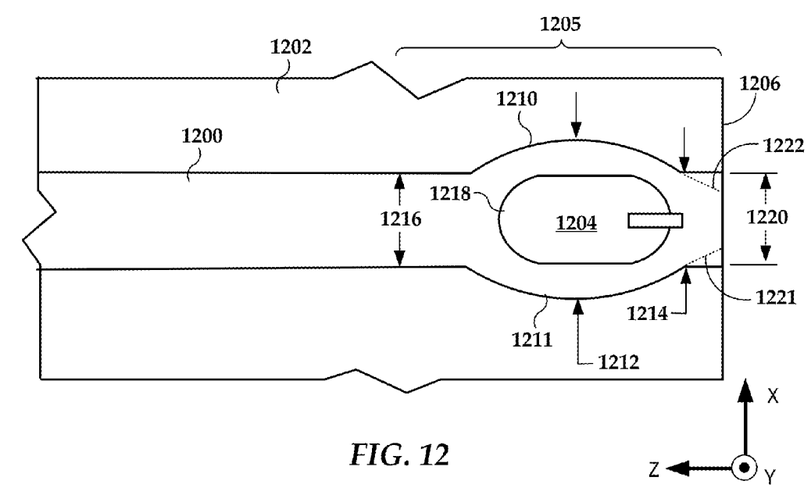

In FIG. 12, a plan view illustrates a waveguide end shape according to another example embodiment. A waveguide core 1200 is shown on a substrate-parallel plane (xz-plane), overlaid on a bottom cladding layer 1202. An end portion 1205 of the core 1200 overlaps a near-field transducer 1204 near a media-facing surface 1206. The end portion 1205 has curved, convex, protrusions 1210, 1211 that cause a bulge in a cross-track dimension of the core 1200. The protrusions 1210, 1211 result in a first crosstrack width 1212 over the near-field transducer 1204 that is greater than a second crosstrack width 1214 near the media-facing surface 1206. The first crosstrack width 1212 is also greater than a third crosstrack width 1216 at an end 1218 of the near-field transducer 1204 that faces away from the media-facing surface 1206, e.g. towards the light source. The difference between the first crosstrack width 1212 and the second and third crosstrack widths 1214, 1216 reduces reflections back to a light source optically coupled to the waveguide core 1200.

The illustrated end portion 1205 has a constant across sectional area between the near-field transducer 1204 and the media-facing surface 1206, and a final cross track width 1220 may be the same or different than the third crosstrack width 1216 of the core 1200 away from the end portion 1205. As indicated by dashed lines 1221, 1222, other configurations may include a taper between the protrusions 1210, 1211 and the media-facing surface 1206. In such a case, the final cross track width may be less than or equal to the third crosstrack width 1216 of the core 1200 away from the end portion 1205. In yet other configurations, the protrusions 1210, 1211 may be differently shaped, e.g., multiple line segments, circular, parabolic, etc.

Figure 13:
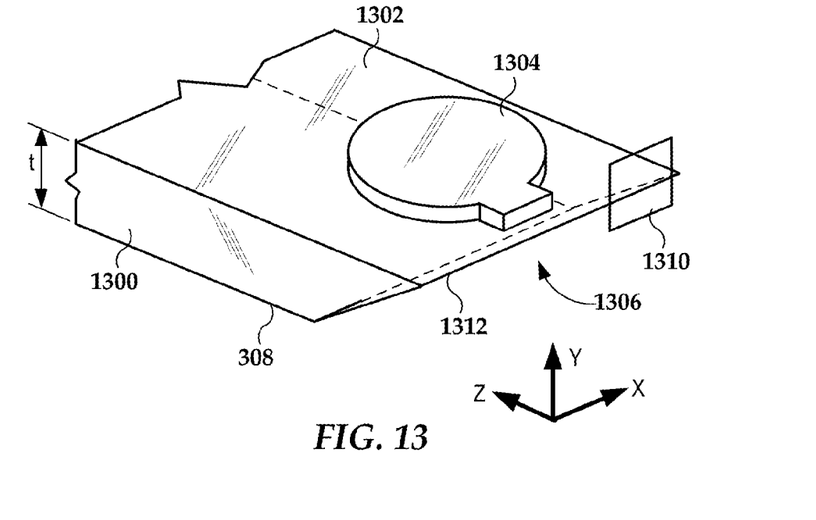
FIG. 13 is a perspective view of a waveguide core according to an example embodiment.

In FIG. 13, a perspective view shows an example of an end of a waveguide core 1300 according to an example embodiment. The core 1300 has a first side 1302 disposed proximate to a near-field transducer 1304. The core 1300 overlaps the near-field transducer 1304 at a substrate-parallel plane (xz-plane). The core 1300 includes a taper 1306 on a second side 1308 that facing away from the first side 1302. The taper 1306 causes a reduced y-direction thickness of the core 1300 normal to the substrate-parallel plane, e.g., compared to thickness t away from the near-field transducer 1304. While the illustrated taper 1306 linearly reduces the thickness of the core 1300, other embodiments may use a curved or segmented profile.

While not shown, a cladding layer encompasses the second side 1308 of the core 1300 and fills in the taper 1306. A second cladding layer (not shown) may be overlaid on the first side 1302 and the near-field transducer 1304. One or both of these cladding layers may also cover edges of the core 1300. A narrowed tip 1312 of the core 1300 is at or near a media-facing surface 1310 (e.g., air bearing surface) of a write head. The tip 1312 may come to a sharp edge as shown (e.g., such that thickness of the core 1300 is approximately zero at the media-facing surface 1310), or have a flat or curved edge (e.g., such that thickness of the core 1300 is non-negligible at the media-facing surface 1310).

The different waveguide features described above may be combined into additional embodiments. For example the taper or steps in core thickness as shown in FIGS. 3, 4, and 13, may be combined with the cross-track width variations shown in FIGS. 8, 11, and 12. The waveguide embodiments shown in FIGS. 3, 4, and 13 can decrease unwanted erasure with modest MH ratio loss. The embodiments shown in FIGS. 8, 11, and 12 may enhance MT by more than 5% by more than 5% and lower back reflection by more than 10% without any MH penalty.

Figure 14:
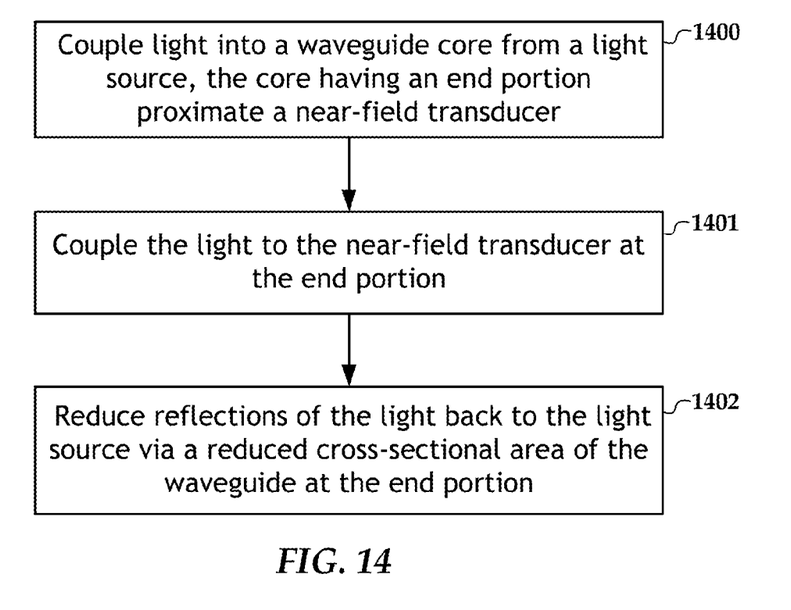
FIG. 14 is a flowchart illustrating a method according to an example embodiment.

In FIG. 14, a flowchart illustrates a method according to an example embodiment. The method involves coupling 1400 light into a waveguide core from a light source, the core having an end portion proximate a near-field transducer. The light is coupled 1401 to the near-field transducer at the end portion. Reflections of the light back to the light source are reduced 1402 via a reduced cross-sectional area of the waveguide at the end portion.

In one embodiment, the reduced cross-sectional area may be achieved by including a step or taper in the core that causes a reduced thickness of the core normal to a substrate-parallel plane. In another embodiment, the reduced cross-sectional area may be achieved by the end portion having a first crosstrack width over the near-field transducer, a second crosstrack width between the media-facing surface and the near-field transducer, and a third crosstrack width at an end of the near-field transducer that faces away from the media-facing surface. In such a case, the first crosstrack width is different than the second and third crosstrack widths. In another embodiment, the reduced cross-sectional area may be achieved by the end portion having tapered edges that each reduces a crosstrack width of the core as it approaches the media-facing surface.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A write head, comprising:
   a near-field transducer near a media-facing surface of the write head;
   a waveguide comprising a core with a first side disposed proximate to the near-field transducer, the core overlapping the near-field transducer at a substrate-parallel plane, the core comprising two rectangular steps on a second side facing away from the first side, the two rectangular steps causing a reduced thickness of the core normal to the substrate-parallel plane, a center region between the two rectangular steps having an unreduced thickness; and
   a cladding layer that encompassing the second side of the core and that fills in the two rectangular steps.

2. The write head of claim 1, wherein the two rectangular steps reduce reflections back to a light source optically coupled to the waveguide.

3. The write head of claim 1, wherein the core further comprises a second taper that reduces a crosstrack width of the core as it approaches the media-facing surface.

4. The write head of claim 1, wherein the core further comprises a first crosstrack width over the near-field transducer, a second crosstrack width near the media-facing surface, and a third crosstrack width at an end of the near-field transducer that faces away from the media-facing surface, the first crosstrack width being different than the second and third crosstrack widths.

5. A write head, comprising:
   a near-field transducer near a media-facing surface of the write head; and
   a waveguide comprising a core having an end portion near the media-facing surface that overlaps the near-field transducer at a substrate-parallel plane, the end portion comprising: a first crosstrack width over the near-field transducer; a second crosstrack width at the media-facing surface, and a third crosstrack width at an end of the near-field transducer that faces away from the media-facing surface, the first crosstrack width being different than the second and third crosstrack widths.

6. The write head of claim 5, wherein the difference between the first crosstrack width and the second and third crosstrack widths reduces reflections back to a light source optically coupled to the waveguide.

7. The write head of claim 5, wherein the third crosstrack width is less than the first and second crosstrack widths.

8. The write head of claim 7, wherein the end portion further comprises tapered edges extending from the near-field transducer to the media-facing surface that result in a reduced crosstrack width of the core as it approaches the media-facing surface.

9. The write head of claim 8, wherein the second crosstrack width of the core at the media-facing surface is less than the first crosstrack width.

10. The write head of claim 7, wherein the end portion comprises curved concave depressions that result in the first crosstrack width being less than the than the second and third crosstrack widths.

11. The rite head of claim 5, wherein the third crosstrack width is greater than the first and second crosstrack widths.

12. The write head of claim 11, wherein the end portion comprises a constant crosstrack width extending from the near-field transducer and the media-facing surface.

13. The write head of claim 11, wherein the end portion comprises curved, concave, protrusions that result in the first crosstrack width being greater than the than the second and third crosstrack widths.

14. A write head, comprising:
   a near-field transducer near a media-facing surface of the write head; and
   a waveguide comprising a core having an end portion near the media-facing surface that overlaps the near-field transducer at a substrate-parallel plane, the end portion comprising tapered edges that each reduce a crosstrack width of the core as it approaches the media-facing surface by a value of dX, the value of dX being nominally about 19% of the crosstrack width, the tapered edges beginning at a distance dZ from the media-facing surface, and the tapered edges reducing reflections back to a light source optically coupled to the waveguide.

15. The write head of claim 11, wherein the distance dZ is nominally between about 94% and 106% the crosstrack width.

16. The write head of claim 11, wherein the core comprises a first side disposed proximate to the near-field transducer, the core comprising one of a step or a taper on a second side facing away from the first side, the step or the taper causing a reduced thickness of the core normal to the substrate-parallel plane.

17. The write head of claim 1, wherein a crosstrack width of the center region is at least 25% that of a crosstrack width of the core at the media-facing surface.

18. The write head of claim 3, wherein the second taper reduces the crosstrack width of the core as it approaches the media-facing surface by a value of dX, the value of dX being between $1/8$ and $1/4$ of the crosstrack width of the core, the second taper reducing reflections back to a light source optically coupled to the waveguide.

19. The write head of claim 4, wherein opposing edges of the core in a region where the core overlaps the near-field transducer comprise symmetric, curved convex or concave edges.

20. The write head of claim 8, wherein the tapered edges reduce the crosstrack width of the core as it approaches the media-facing surface by a value of dX, the value of dX being between $1/8$ and $1/4$ of the crosstrack width of the core, the second taper reducing reflections back to a light source optically coupled to the waveguide.

* * * * *